United States Patent
Rogers et al.

(10) Patent No.: US 10,423,354 B2
(45) Date of Patent: Sep. 24, 2019

(54) SELECTIVE DATA COPYING BETWEEN MEMORY MODULES

(71) Applicants: Advanced Micro Devices, Inc., Sunnyvale, CA (US); ATI TECHNOLOGIES ULC, Markham (CA)

(72) Inventors: Philip Rogers, Austin, TX (US); Benjamin T. Sander, Austin, TX (US); Anthony Asaro, Toronto (CA); Gongxian Jeffrey Cheng, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 234 days.

(21) Appl. No.: 14/863,026

(22) Filed: Sep. 23, 2015

(65) Prior Publication Data
US 2017/0083240 A1    Mar. 23, 2017

(51) Int. Cl.
*G06F 3/06* (2006.01)
*G06F 13/28* (2006.01)
*G06F 12/1009* (2016.01)

(52) U.S. Cl.
CPC ............ *G06F 3/065* (2013.01); *G06F 3/0604* (2013.01); *G06F 3/064* (2013.01); *G06F 3/0683* (2013.01); *G06F 12/1009* (2013.01); *G06F 13/28* (2013.01); *G06F 2212/1016* (2013.01); *G06F 2212/50* (2013.01); *Y02D 10/13* (2018.01); *Y02D 10/14* (2018.01)

(58) Field of Classification Search
CPC ........ G06F 3/065; G06F 13/28; G06F 3/0683; G06F 3/064; G06F 3/0604; G06F 12/0891; G06F 2212/50; G06F 12/1009; G06F 2212/1016; Y02B 60/1228; Y02D 10/13; Y02D 10/14
See application file for complete search history.

(56) References Cited

U.S. PATENT DOCUMENTS

| | | | |
|---|---|---|---|
| 5,926,832 A * | 7/1999 | Wing | G06F 9/3834 703/23 |
| 6,370,625 B1 * | 4/2002 | Carmean | G06F 9/3004 711/150 |
| 6,594,711 B1 * | 7/2003 | Anderson | G06F 12/0802 710/22 |
| 6,754,781 B2 * | 6/2004 | Chauvel | G06F 1/206 711/135 |
| 9,690,666 B1 * | 6/2017 | Shembavnekar | G06F 11/1451 |
| 2004/0088505 A1 * | 5/2004 | Watanabe | G06F 3/0608 711/161 |
| 2013/0145088 A1 * | 6/2013 | Frost | G06F 11/1008 711/103 |

* cited by examiner

*Primary Examiner* — Rocio Del Mar Perez-Velez

(57) ABSTRACT

A memory manager of a processor identifies a block of data for eviction from a first memory module to a second memory module. In response, the processor copies only those portions of the data block that have been identified as modified portions to the second memory module. The amount of data to be copied is thereby reduced, improving memory management efficiency and reducing processor power consumption.

20 Claims, 3 Drawing Sheets

SELECTIVE DATA COPYING BETWEEN MEMORY MODULES

BACKGROUND

Field of the Disclosure

The present disclosure relates generally to processors and more particularly to memory management at processors.

Description of the Related Art

To improve processing speed some processors, referred to as heterogeneous processors, employ heterogeneous processing units, which may be dedicated to special processing functions. For example, a processor may employ one or more central processing unit (CPU) cores to execute general-purpose instructions and one or more graphics processing units (GPUs) to execute parallel processing instructions and functions related to graphics and display operations. The GPUs include circuitry specifically designed to execute these operations, improving overall processor performance. In addition, a processor can employ a non-uniform memory architecture (NUMA), wherein different memory modules associated with the processor have different access speeds and latencies that can be accessed more efficiently by some processors than by others. A memory manager, such as an operating system (OS) or hardware module can transfer data between the memory modules so the data can be accessed more efficiently by the processing unit that is to access the data next. However, the data transfers can consume an undesirably large amount of processor resources and memory bandwidth, impacting processor performance and power consumption.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for transferring only the modified portions of a block of data between memory modules associated with a processor, thereby reducing the amount of data transferred in the course of memory management at the processor. The processor is associated with at least two memory modules, wherein one of the memory modules is configured as system memory for a processing unit of the processor. A memory manager copies blocks of data that are likely to be accessed by the processing unit from the system memory to the other memory module. As the processing unit modifies portions of the data at a data block, the processor sets indicators identifying the modified portions. When the memory manager identifies a block of data for eviction from the memory module to the system memory, the processor copies only those portions of the data block that have been identified as modified portions to the system memory, since the system memory already holds a copy of the original data before the recent modifications. The amount of data to be copied is thereby reduced, improving memory management efficiency and reducing processor power consumption.

In some embodiments, an operating system (OS) executing at the processor evicts a block of data by issuing a set of copy commands to a direct memory access (DMA) module of the processor. The DMA module can be configured to identify a subset of the copy commands corresponding to modified portions of the data block. The DMA module then executes only the identified subset of copy commands, thereby copying only the modified portions of the data block to the system memory. The processor can thereby improve the efficiency of memory management without requiring redesign or modification of the OS or other memory management software and hardware. In some embodiments the copy commands can be identified to the DMA module as having physical memory addresses, thereby obviating the need for the DMA module to translate addresses of the copy commands, further improving memory management efficiency.

Figure 1:
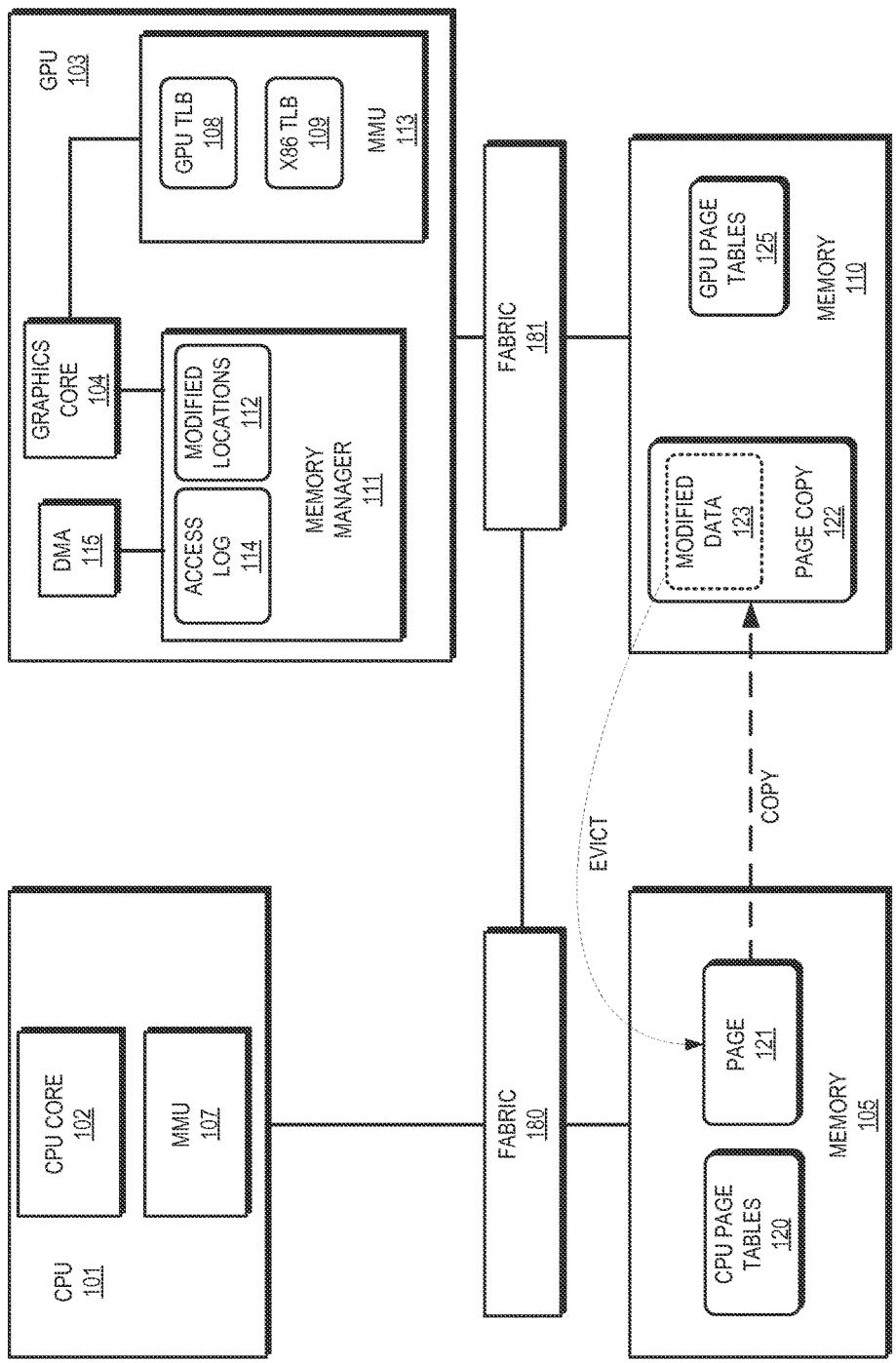
FIG. 1 is a block diagram of a processor that transfers only modified portions of a data block when the data block is evicted from one memory module to another memory module in accordance with some embodiments.

FIG. 1 illustrates a heterogeneous processing system 100 in accordance with some embodiments. The processing system 100 can be incorporated into any of a variety of electronic devices, including a desktop computer, laptop computer, server, gaming console, smartphone, tablet, and the like. The processing system 100 is generally configured to execute instructions, organized in the form of one or more computer programs, to perform tasks on behalf of an electronic device. To facilitate execution of instructions, the processing system 100 includes a CPU 101 and a GPU 103. The CPU 101 includes a CPU core 102 having one or more instruction pipelines and associated circuitry to execute general-purpose instructions. For example, the CPU core 102 can include an instruction pipeline having a fetch stage to fetch instructions, a decode stage to decode each instruction into one or more operations, execution stages to execute the operations, and a retire stage to retire executed instructions.

The GPU 103 includes a graphics core 104 which includes circuitry to execute parallel processing operations and operations related to graphics and display functions. In some embodiments, the graphics core 104 includes a plurality of single-instruction multiple-data (SIMD) units configured to execute, in parallel, the same or similar operations on multiple units of data (e.g., multiple fields of the same vector or array). It will be appreciated that in some embodiments the processing system 100 can include additional CPU cores and graphics cores. Further, in some embodiments the processing system 100 can include other types of processing units in addition to or instead of CPUs and GPUs, such as digital signal processor (DSP) units, field programmable gate arrays (FPGAs), and the like.

In the illustrated example, the processing system 100 includes memory modules 105 and 110. These memory modules are in addition to any caches or scratchpads (not shown) dedicated to one of the CPU 101 and GPU 103. In some embodiments, the memory modules are of different architectures that are accessed in different ways, such that, each of the memory modules can be more efficiently accessed by one of the CPU 101 and GPU 103. For example, in some embodiments the CPU 101, GPU 103 and the memory module 110 are each formed on a separate integrated circuit die, and the separate dies stacked in a three-dimensional (3D) integrated circuit arrangement so that the memory module 110 can be accessed relatively quickly by the GPU 103. The memory module 105 is typically larger, from a storage standpoint, than the memory module 110 and is packaged separately from the 3D integrated circuit that includes the CPU 101, GPU 103 and memory module 110. As a result, the GPU can access (read and write) data more quickly than data at the memory module 105. In some embodiments, the CPU 101 may be associated with another memory module (not shown) formed at another integrated circuit die and stacked in the 3D circuit arrangement, providing the CPU 101 with fast access to data at the memory module.

To facilitate communications between the CPU 101, the GPU 103, and the memory modules 105 and 110, the processing system 100 includes fabric 180 and fabric 181. The fabrics 180 and 181 provide a communication fabric and associated management circuitry to provide for point-to-point communications between each of CPU 101, the GPU 103, and the memory modules 105 and 110. For example, the fabric 180 includes circuitry to receive messages, such as memory access requests, from the CPU 101, to identify the destination targeted by the message, such as the memory module 105, and to route the message to its destination. The fabrics 180 and 181 are connected to each other, allowing for messages to be communicated between any two points of the processing system 100.

To improve processing efficiency at the GPU 103, the processing system 100 employs a memory management scheme wherein data that has recently been accessed by the GPU 103, or is predicted to be accessed in the near future, is transferred from the memory module 105 to the memory module 110, where it can be more quickly accessed. To support this memory management scheme, the GPU 103 includes a memory manager 111 that monitors memory access requests generated by the GPU 103 and records the physical addresses of the memory locations accessed by the requests in an access log 114. The memory manager 111 identifies patterns in the addresses stored at the access log 114 and, based on those patterns, can issue commands to copy data from the memory module 105 to the memory module 110 so that it can be accessed more quickly by the GPU 103. The memory manager 111 can identify the patterns in any of a variety of ways, including based on explicit demands for one or more portions of a page, based on observed data patterns in requests for data by the GPU 103, based on explicit or implicit hints from software executing at the CPU 101 or the GPU 103, and the like, or any combination thereof.

In the illustrated example of FIG. 1 the memory manager 111 is a dedicated hardware module, but in some embodiments the memory manager 111 can include a portion of an OS or a hardware module that works in conjunction with an OS to perform memory management. For purposes of discussion, the memory manager 111 identifies blocks of data at a granularity referred to as a page. In some embodiments, the pages can correspond in size, and associated boundaries, to memory pages employed by the OS to assist in virtualization of physical memory for programs executing at the processing system 100. In some embodiments, the size or boundaries of the pages employed by the memory manager 111 is different than the pages employed by the OS.

To illustrate the memory management scheme via an example, the system memory 105 stores a data page 121. In response to determining, based on the access log 114, that the page 121 has been accessed by the GPU 103 a threshold number of times, the memory manager 111 issues commands to copy the page 121 to the memory module 110 as page copy 122. This allows subsequent accesses by the GPU 103 to the data at the page to be satisfied at the memory module 110, rather than at the memory module 105. Because the GPU 103 can access the memory module 110 more efficiently than the memory module 105, the copying of the page 121 to the memory module 110 improves processing efficiency.

After a data page has been copied to the memory module 110, a subset of data may be modified by the GPU 103 via write requests. In many cases, these write requests modify only a subset, rather than all, of the data at the page copy. Accordingly, over time some, but not all, of the data at a page copy differs from the data in the original page. For example, the page copy 122 includes modified data 123, representing data that has been changed at the page copy 122 by write requests from the GPU 103. Further, in response to particular events, such as the memory manager scheduling a new page to be copied to the memory module 105, each page copy at the memory module 110 is evicted, so that it is no longer accessible at the memory module 110. In order to preserve data coherency at the processing system 100 and thereby prevent errors, changes in a page copy must be reconciled with the original page at the memory module 105, either prior to or in response to the page copy eviction. However, because the memory module 105 maintains storage of the original page, the processing system 100 reconciles the changes by copying to the memory module 105 only the subset of data at the page copy that was changed, rather than copying the entire page copy back to the memory module 105. This reduces the amount of data copied between the memory modules 105 and 110, reducing power consumption and memory overhead at the processing system 100.

It will be appreciated that although in the example of FIG. 1, the processing system 100 tracks changes in a page, and reconciles those changes, at the granularity of individual entries of a page (e.g., at the granularity of a cache line for a cache (not shown) of the processing system 100), in some embodiments the processing system can track and reconcile changes at a larger or smaller granularity. For example, in some embodiments the processing system 100 tracks changes at the granularity of a memory page. Thus, the processing system 100 can copy a set of pages from the memory module 105 to the memory module 110 based on access patterns, record changes to individual pages at the memory module 110 and, in response to the set of pages being evicted from the memory module 110, copy to the memory module 105 only those pages that have been changed.

Returning to the example of FIG. 1, to facilitate efficient eviction of pages the memory manager 111 stores indicators of the modified portions of a page at a set of storage locations, designated modified locations 112 at FIG. 1. The modified locations 112 can include, for example, physical addresses of the memory locations that have been modified by write requests to a portion of one or more pages at the memory module 110. For example, the GPU can issue write requests to memory locations corresponding to portions of the page copy 122, resulting in modified data 123. In response to each write request to the memory locations, the memory manager 111 sets an indicator of the modified location by storing the physical address of the write request at the modified locations 112. The modified locations 112 thus reflect the addresses of the modified data 123.

To evict a page, the memory manager 111 identifies the subset of locations of the page that have been modified, as indicated by the modified locations 112. For purposes of description, this subset of locations is referred to as the "modified subset" of the page to be evicted. The memory manager 111 controls portions of the processing system 100 so that only the modified subset of the page to be evicted is copied from the memory module 110 to corresponding locations of the memory module 105, thus evicting the page. For example, when the page copy 122 (representing the page 121) is selected for eviction, the memory manager 111 causes only the modified data 123 to be copied to the page 121, and any unmodified locations are not copied to the page 121. Because the other locations of the page were not modified at the memory module 110, the corresponding locations at the memory module 105 store the same data. Thus, after the eviction and the associated copying of the modified data 123, the memory module 105 stores up-to-date data for the page including any changes made at the memory module 110.

To further illustrate, the page 121 (and therefore the page copy 122) may have 5 locations, designated A, B, C, D, and E. As the GPU 103 executes its operations, it modifies locations A, C, and D at the page copy 122, but leaves data at locations B and E unchanged. Accordingly, when the memory manager 111 selects the page copy 122 for eviction, it copies locations A, C, and D to the page 121, but not locations B and E. By copying only the modified subset, rather than the entire page, the memory manager reduces the consumption of processor resources to perform an eviction without impacting integrity of the data at the pages.

To support copying of data from the memory module 105 to the memory module 110, and subsequent eviction of data from the memory module 110 to the memory module 105, the processing system 100 employs an address translation scheme using different page tables depending on the location of the data. To illustrate, the memory modules 105 and 110 each include a plurality of memory locations, with each memory location corresponding to a different physical address. To simplify design and operation of programs for the processing system 100, the processing system 100 supports a virtual addressing scheme, wherein the programs executed by the processing system 100 generate memory access operations based on a virtual address space, and the processing system 100 translates that virtual address space to physical addresses at the memory modules 105 and 110. To illustrate, each memory access request generated by the CPU 101 or the GPU 103 includes a virtual address indicating the location of the data to be accessed. To facilitate translation of virtual addresses to physical addresses, each of the CPU 101 and GPU 103 include a memory management unit (MMU) (MMU 107 and MMU 113, respectively) to translate each virtual address to a corresponding physical address that indicates the location of one of the memory modules 105 and 110 where the data is stored.

To facilitate translation of virtual addresses to physical addresses, an operating system or other program at the processing system 100 generates a set of page tables for each of the CPU cores 102. In the embodiment of FIG. 1, the set of page tables for the CPU core 102 is illustrated as CPU page tables 120. The CPU page tables 120 represent a mapping of the virtual address space for the corresponding processing unit to a corresponding set of physical addresses indicating the memory locations where the corresponding data is stored at the memory module 105. In response to the CPU 101 issuing a memory access, the MMU 107 translates the virtual address of the request to the corresponding physical address using the page tables of the processing unit that issued the request. In particular, the MMU 107 performs a page walk to identify an entry of the page table corresponding to the virtual address of the request. The identified page table entry indicates the physical address corresponding to the virtual address.

The MMU 113 of the GPU 103 performs a similar function as the MMU 107, but because the GPU 103 accesses data both at the memory module 105 and at the memory module 110, the GPU employs different page tables for address translation, depending on where the data it is accessing is stored. To illustrate, the memory module 110 stores a set of page tables, illustrated as GPU page tables 125, that reflects the virtual-to-physical address mappings for data stored at the memory module 110. When data is copied from the memory module 105 to the memory module 110, the MMU 113 updates the GPU page tables 125 to store the virtual addresses for the copied data and the corresponding physical addresses at the memory module 110. In response to data being evicted from the memory module 110 to the memory module 105, the MMU 113 modifies the entries of the GPU page tables 125 corresponding to the physical addresses of the evicted data so that they correspond to physical addresses at the memory module 105. In response to receiving a memory access request from the graphics core 104, the MMU 113 checks the GPU page tables 125 to identify if the tables include a valid entry for the virtual address of the memory access request. If so, the MMU 113 uses the GPU page tables 125 to translate the virtual address to a physical address, so that the memory access request is satisfied at the memory module 110 or the memory module 105, depending on the physical address in the GPU page tables 125. By employing the different page tables 120 and 125 for address translation, the processing system 100 can move data between the memory module 105 and the memory module 110 to improve memory access efficiency, while rendering the data movement transparent to programs executing at the processing system 100.

In the illustrated example of FIG. 1, the MMU 113 facilitates address translation using translation look-aside buffers (TLBs) 108 and 109 to store recently accessed entries of the GPU page tables 125 and CPU page tables 120, respectively. In response to receiving a memory access request, the MMU 113 can first check the TLBs 108 and 109 to identify if they store a valid virtual-to-physical address mapping for the memory access request and if so, use that mapping to perform address translation. If neither of the TLBs 108 and 109 includes a valid mapping, the MMU 113 can access the GPU page tables 125 and CPU page tables 120 as described above.

In the example of FIG. 1, the processing system 100 includes a DMA module 115 to facilitate memory management and other memory operations. The DMA module 115 can autonomously (without intervention by the CPU 101 or other processor core) execute memory accesses to copy or move data between memory modules based on descriptors issued by modules of the processing system 100. For example, a descriptor can indicate a range of source memory locations (e.g. locations corresponding to a page) at a memory module and a range of destination memory locations. In response to the descriptor, the DMA module 115 can copy the data from the range of source memory locations to the range of destination memory locations. In some embodiments, the DMA module 115 can perform this operation with its own hardware directly, rather than through the CPU 101 or GPU 103. Thus, to copy the page 121 to the page copy 122, the memory manager 111 can issue a descriptor to the DMA module 115 indicating the corresponding ranges of memory locations, and indicating that the transfer is a copy.

To evict a page at the memory module 110, the memory manager 111 can issue a descriptor to the DMA module 115 indicating the range of memory locations at the memory module 110 corresponding to the page being evicted and the range of memory locations at the memory module 110 corresponding to the original page. In addition, the descriptor indicates that the transfer to be carried out is an eviction. In response, the DMA module 115 identifies the portions of the page that have been modified based on the modified locations 112, and issues memory access requests so that only the modified portions of the page are copied, rather than the entire page. In some embodiments to evict a page the memory manager 111, the DMA module 115, or other module first generates an initial set of commands for the DMA module 115 to copy the entire page, including unmodified portions, from the memory module 105 to the memory module 110. The DMA module 115 then executes only the subset of commands corresponding to the modified locations so that only the modified portions are copied. This allows only the modified portions to be copied without extensive modification or redesign of the memory access pathways that generate the initial set of commands.

Figure 2:
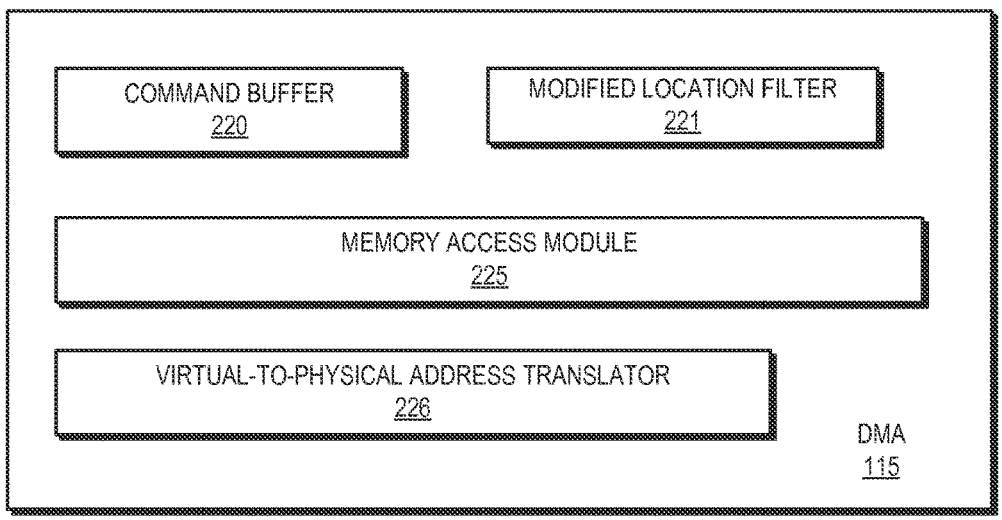
FIG. 2 is a block diagram of a direct memory access (DMA) module of FIG. 1 that manages the transfer of modified portions of a data block between memory modules in accordance with some embodiments.

FIG. 2 illustrates a block diagram of the DMA module 115 of FIG. 1 in accordance with some embodiments. In the illustrated example, the DMA module 115 includes a command buffer 220, a modified location filter 221, a memory access module 225, and a virtual-to-physical address translator 226. The command buffer 220 stores received commands for execution at the DMA module 115. In some embodiments the DMA module 115 receives the commands in the form of descriptors, each identifying one or more memory location ranges (e.g., a source range, a destination range) and a corresponding operation (e.g., read, write, move, copy) to be performed at the indicated range. The DMA module 115 can interpret each descriptor directly to perform the indicated operation at the indicated memory location ranges or in some embodiments can translate a descriptor into a set of corresponding commands to execute the operation. In some embodiments, the sets of commands are generated by the processor core or other module (e.g., the memory manager 111) that is requesting the operation. In whichever format they are received or generated, the DMA module 115 stores the commands at the command buffer 220 for subsequent execution.

The modified location filter 221 is a module configured to filter commands at the command buffer 220 in order to remove eviction commands corresponding to unmodified memory locations of the memory module 110. In some embodiments, the modified location filter 221 analyzes the commands stored at the command buffer 220 and identifies, based on command fields or other identifiers, those commands corresponding to eviction commands. The modified location filter 221 accesses the modified locations 112 (FIG. 1) to identify those commands corresponding to memory locations whose data has been modified by the GPU 103 at the memory module 110. The filter 221 removes those commands corresponding to memory locations storing unmodified data from the eviction commands at the command buffer 220. The modified location filter 221 can remove commands by deleting commands, setting fields in the commands so that the commands are not executed, setting pointers or other parameters of the command buffer 220 so that the removed commands are skipped or not accessed by the buffer, and the like. The modified location filter 221 can also remove commands by modifying a descriptor, generating a new descriptor, or a combination thereof. For example, if a descriptor identifies a range of addresses for eviction and some of the memory locations in the address range are unmodified locations, the modified location filter can modify the descriptor to remove the unmodified location from the range, or delete the descriptor and generate new descriptors so that only modified locations within the address range are copied.

The memory access module 225 is a module that executes the commands at the command buffer 220. Accordingly, the memory access module 225 can generate memory access operations, including write operations, read operations, copy operations, and the like, and any combination thereof in order to carry out the commands stored at the command buffer 220. The memory access module 225 can provide these operations to the memory modules 105 and 110 directly for execution, to an intermediary module such as a memory controller (not shown), or otherwise place the operations in an appropriate path of the processing system 100 so that the operations are executed.

In some embodiments, the commands stored at the command buffer 220 can identify the memory locations to be operated upon using either of a physical memory address or a virtual address used by software executing at the processing system 100. The type of address used by a particular command can be indicated, for example, by a field of the command or other indication from a processor core or other module. The DMA module 115 includes the virtual-to-physical address translator 226 to translate virtual addresses of the commands to corresponding physical addresses so that the command can be executed by the memory access module 225. In some embodiments, the virtual-to-physical address translator 226 does not translate the addresses directly, but provides an interface to the MMU 113 (FIG. 1) for address translation. To improve eviction speed, the memory manager 111 can generate eviction commands so that the commands employ physical addresses, rather than virtual addresses. This ensures that the addresses of the commands do not have to be translated, which can reduce the rate of eviction and thereby limit the impact of memory management.

Figure 3:
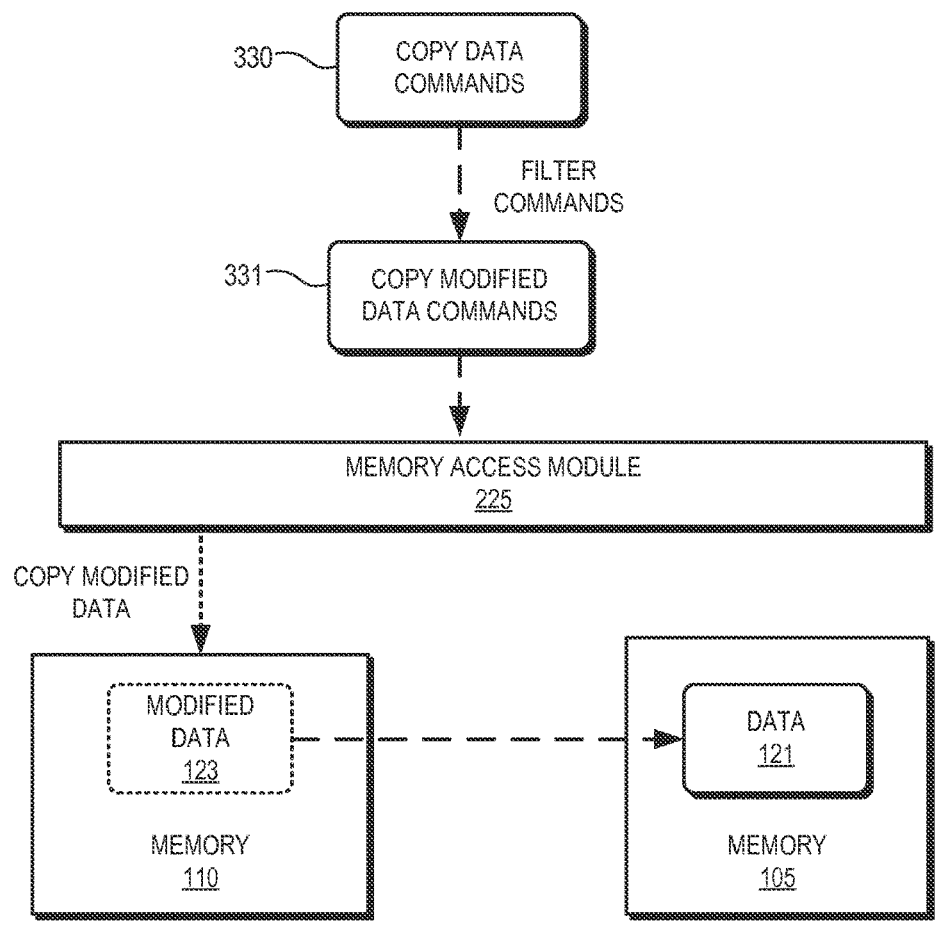
FIG. 3 is a block diagram illustrating a transfer of modified portions of a block of data between memory modules of the processor of FIG. 1 in accordance with some embodiments.

FIG. 3 illustrates an example of the DMA module 115 of FIG. 2 evicting the page copy 122 from the memory module 110 in accordance with some embodiments. In the illustrated example, the DMA module 115 receives a descriptor (not shown) indicating the page copy 122 is to be evicted. In response, the DMA module 115 generates the initial set of copy commands, designated copy data commands 330. These commands include commands to copy all of the locations of the page copy 122, including the unmodified portions, to the page 121. The modified location filter 221 identifies the locations corresponding to the modified data 123, and filters the data commands 330 to remove commands corresponding to unmodified locations of the page copy 122. The result is the subset of commands corresponding to modified locations of the page copy 122, designated copy modified data commands 331. In at least one embodiment, as each of the copy modified data commands 331 is identified, a corresponding indicator for the physical address at the modified locations 112 (FIG. 1) is cleared. In some cases, the indicator for the physical address is the physical address itself being stored at the modified locations 112, and the indicator is cleared by removing the physical address from the modified locations 112. The memory access module 225 executes the copy modified data commands 331, thereby copying only the modified data 123, rather than the entire page copy 122, to the page 121.

Figure 4:
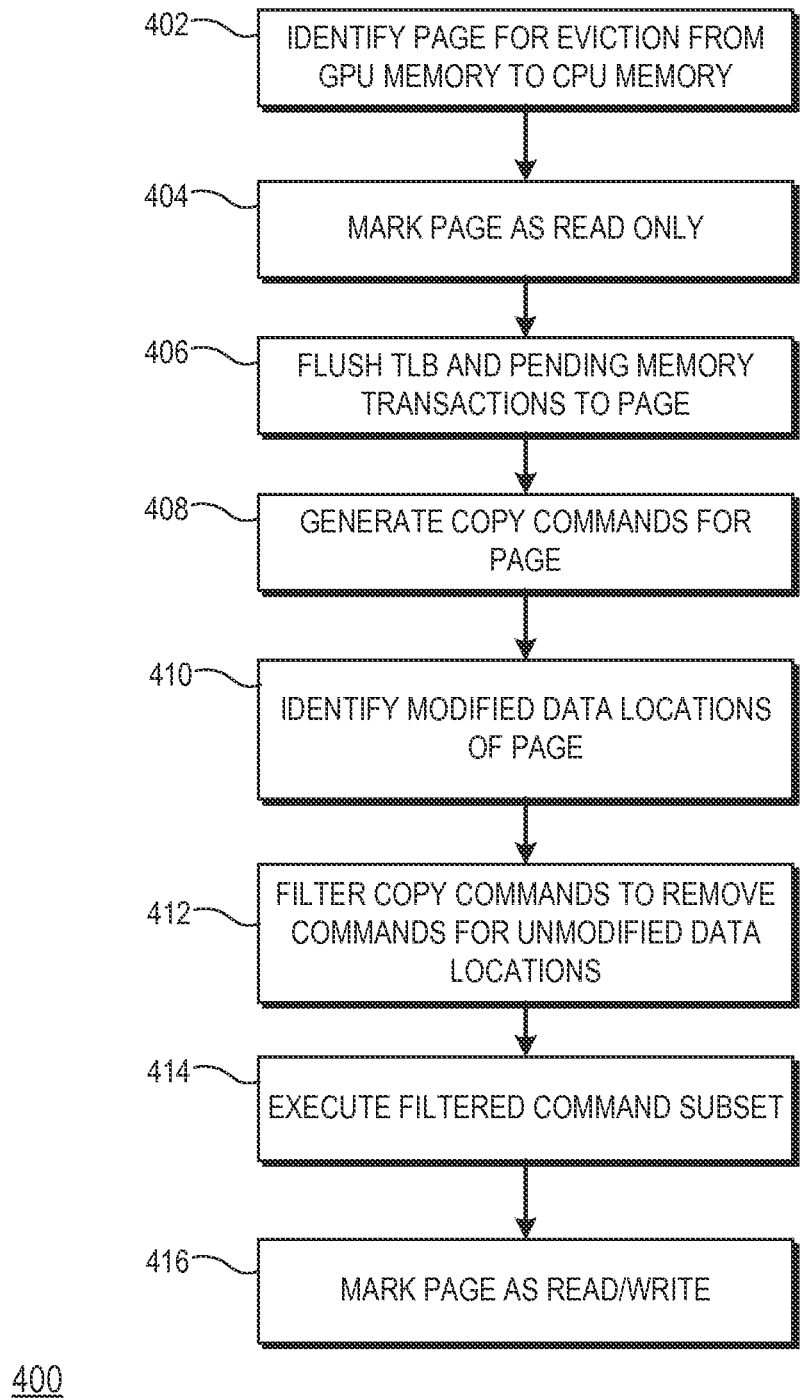
FIG. 4 is a flow diagram of a method of transferring modified portions of a block of data between memory modules in accordance with some embodiments.

FIG. 4 illustrates a flow diagram of a method 400 of evicting a page of data from the memory module 110 to the memory module 105 of the processing system 100 in accordance with some embodiments. At block 402 the memory manager 111 identifies a page at the memory module 110 for eviction. At block 404, the memory manager 111 identifies the page as read only at one or more of the CPU page tables 120 and GPU page tables 125, so that the page is un-writeable. Write accesses to the page are not executed while the page is un-writeable. This ensures that none of the locations of the page being evicted are modified during the eviction process, thus maintaining integrity of the data at the page. At block 406 the memory manager 111 flushes the TLB 108 and any pending memory transactions targeted to the page being evicted. This ensures that any such pending memory transactions are not satisfied at the memory locations corresponding to the page being evicted during the eviction process, which could result in errors such as incorrect data being read from the memory locations.

At block 408, the DMA module 115 generates an initial set of copy commands to copy all locations of the page being evicted from the memory module 110 to the memory module 105. At block 410, the DMA module 115 identifies, based on the modified locations 112, the portions of the page that have been modified while it was stored at the memory module 110. At block 412, the DMA module 115 filters the initial set of copy commands to remove commands corresponding to portions of the page that were not modified. At block 414, the DMA module 115 executes the resulting subset of commands, so that only modified portions of the page being evicted are copied the memory module 105. At block 416, the memory manager 111 marks the page as being in a read/write state, so that memory accesses to the page can be resumed.

In some embodiments, the apparatus and techniques described above are implemented in a system comprising one or more integrated circuit (IC) devices (also referred to as integrated circuit packages or microchips), such as the processor described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to receiving, at a direct memory access (DMA) module of a processor, a request to copy a block of data from a first memory module associated with the processor to a second memory module associated with the processor, the request including a plurality of copy commands, each copy command including a physical address associated with corresponding modified portions of the block of data:
identifying a subset of the block of data as modified data by filtering out copy commands of the plurality of copy commands corresponding to unmodified data; and
copying only the subset of the block of data from the first memory module to the second memory module by executing a subset of the plurality of copy commands.

2. The method of claim 1, wherein: copying the subset of the block of data comprises executing the subset of the plurality of copy commands at the DMA module.

3. The method of claim 2, further comprising:
generating the plurality of copy commands so that each of the plurality of copy commands includes the physical address associated with the corresponding portion of the block of data.

4. The method of claim 2, further comprising:
receiving at the DMA module an indication that the plurality of copy commands include physical addresses instead of virtual addresses.

5. The method of claim 2, further comprising:
in response to a write request to a memory address corresponding to a portion of the block of data, setting an indicator to indicate the memory address corresponds to modified data; and
wherein filtering the plurality of copy commands comprises placing a copy command corresponding to the memory address in the subset of the plurality of copy commands based on the indicator being set.

6. The method of claim 5, further comprising:
clearing the indicator in response to placing the copy command in the subset of copy commands.

7. The method of claim 2, further comprising:
prior to copying the subset of the block of data, marking a page associated with the block of data as un-writeable; and
in response to copying the subset of the block of data, marking the page associated with the block of data as writeable.

8. The method of claim 7, further comprising:
in response to the request to copy the block of data, flushing a translation look-aside buffer (TLB) of the processor.

9. The method of claim 7, further comprising:
in response to the request to copy the block of data, flushing pending memory accesses targeted to the block of data.

10. A method, comprising:
receiving a plurality of copy commands at a direct memory access (DMA) module of a processor in response to a request to copy a block of data from a first memory module to a second memory module;
identifying a subset of the plurality of copy commands as corresponding to modified portions of the block of data by filtering out copy commands of the plurality of copy commands corresponding to unmodified data, each copy command including a physical address associated with corresponding modified portions of the block of data; and
executing only the subset of the plurality of copy commands at the DMA module.

11. The method of claim 10, wherein identifying the subset of the plurality of copy commands comprises:
identifying the subset of the plurality of copy commands based on indicators associated with the modified portions of the block of data, the indicators separate from a set of page tables associated with the block of data.

12. A processor comprising:
a set of storage locations to store indicators identifying modified portions of a block of data at a first memory module; and
a direct memory access (DMA) module coupled to the set of storage locations, the DMA module comprising:
a modified location filter to identify a subset of the block of data as modified data, by filtering out copy commands corresponding to unmodified data, based on the indicators in response to receiving a request to copy the block of data from the first memory module to a second memory module associated with the processor, the request including a plurality of copy commands, each copy command including a physical address corresponding to a portion of the block of data; and
a memory access module to copy the subset of modified data from the first memory module to the second memory module based on the filtered copy commands.

13. The processor of claim 12, wherein:
the memory access module is to copy the subset of modified data by executing the subset of the plurality of copy commands.

14. The processor of claim 13, further comprising:
a processor core to generate the plurality of copy commands.

15. The processor of claim 12, wherein:
the DMA module is to receive an indication that the plurality of copy commands include physical addresses instead of virtual addresses.

16. The processor of claim 14, wherein:
the processor core further is to set an indicator to indicate the physical address corresponds to modified data, in response to a write request to a memory address corresponding to a portion of the block of data; and
the DMA module is to filter the plurality of copy commands by placing a copy command corresponding to the memory address in a subset of copy commands based on the indicator being set and execute the subset of copy commands.

17. The processor of claim 16, wherein the processor core further is to:
clear the indicator in response to placing the copy command in the subset of copy commands.

18. The processor of claim 14, wherein the processor core further is to:
prior to copying the subset of modified data, mark a page associated with the block of data as un-writeable; and
in response to completion of copying the subset of modified data, mark the page associated with the block of data as writeable.

19. The processor of claim 18, further comprising:
a translation look-aside buffer (TLB); and
wherein the processor core is to, in response to the request to copy the block of data, flush the TLB.

20. The processor of claim 18, wherein the processor core further is to:

in response to the request to copy the block of data, flush pending memory accesses targeted to the block of data.

* * * * *